(12) United States Patent
Gadge et al.

(10) Patent No.: US 11,099,642 B2
(45) Date of Patent: Aug. 24, 2021

(54) DISPLAY ADAPTATION FOR VISUAL IMPAIRMENT

(71) Applicant: International Business Machines Corporation, Armonk, NY (US)

(72) Inventors: Vaibhav Vijay Gadge, Pune (IN); Ramakrishna Gorthi, Chinchwad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/528,806

(22) Filed: Aug. 1, 2019

(65) Prior Publication Data

US 2021/0034147 A1 Feb. 4, 2021

(51) Int. Cl.
| | |
|---|---|
| *G06F 3/01* | (2006.01) |
| *G06F 3/0484* | (2013.01) |
| *G06F 3/147* | (2006.01) |
| *G06T 7/70* | (2017.01) |
| *G06T 3/40* | (2006.01) |
| *G06T 11/00* | (2006.01) |
| *G09G 5/26* | (2006.01) |

(52) U.S. Cl.
CPC ............ *G06F 3/013* (2013.01); *G06F 3/0484* (2013.01); *G06F 3/147* (2013.01); *G06T 3/40* (2013.01); *G06T 7/70* (2017.01); *G06T 11/001* (2013.01); *G09G 5/26* (2013.01); *G06F 2203/04806* (2013.01); *G06T 2207/30201* (2013.01); *G09G 2340/14* (2013.01)

(58) Field of Classification Search
CPC ........ G06F 3/013; G06F 3/0484; G06F 3/147; G06F 2203/04806; G06F 3/04897; G06T 7/70; G06T 3/40; G06T 11/001; G06T 2207/30201; G06T 2207/30041; G09G 5/26; G09G 2340/14; G09G 5/02; G09G 5/10; G09G 2354/00; G09G 2380/08; G09G 2340/045; G09B 21/008
See application file for complete search history.

(56) References Cited

U.S. PATENT DOCUMENTS

| | | | |
|---|---|---|---|
| 9,159,299 B2 | 10/2015 | Lee | |
| 2002/0103479 A1* | 8/2002 | Sarver | A61B 3/0025 606/4 |
| 2011/0122144 A1 | 5/2011 | Gabay | |
| 2012/0001932 A1 | 1/2012 | Burnett et al. | |
| 2014/0118354 A1 | 5/2014 | Pais et al. | |
| 2016/0029884 A1 | 2/2016 | Kockan | |
| 2016/0262613 A1* | 9/2016 | Klin | A61B 5/163 |
| 2017/0293356 A1* | 10/2017 | Khaderi | A61B 3/024 |
| 2017/0372679 A1 | 12/2017 | Ye | |
| 2018/0136486 A1* | 5/2018 | Macnamara | A61B 3/14 |
| 2018/0164879 A1* | 6/2018 | Moffat | G06F 3/012 |
| 2020/0314416 A1* | 10/2020 | Sinha | G09G 5/26 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

*Primary Examiner* — Kyle Zhai
*Assistant Examiner* — Andrew Shin
(74) *Attorney, Agent, or Firm* — Jared C. Chaney (57) ABSTRACT

Eye data is recorded and a visual impairment of an eye viewing a screen is determined. A correction value is determined based on the visual impairment, and a display connected to a personal computing device is adjusted based on the correction value.

17 Claims, 6 Drawing Sheets

DISPLAY ADAPTATION FOR VISUAL IMPAIRMENT

BACKGROUND

Aspects of the present disclosure relate to display adaptation for visual impairment. Approximately 75% of adults use some sort of vision correction. Similarly, 60% of the people who use glasses are farsighted. As people age, they are more likely to need vision correction for farsightedness.

Many people that use displayed screens daily need the assistance of glasses.

BRIEF SUMMARY

The present disclosure provides a method, computer program product, and system of display adaptation for visual impairment. In some embodiments, the method includes recording eye data, for an eye viewing a screen on a personal computing device, with one or more sensors, determining a visual impairment of the eye based on the recording, calculating a corrective value to address the visual impairment, and adjusting a display system connected to the screen based on the corrective values.

In some embodiments, the system includes a processor, and a memory in communication with the processor, the memory containing program instructions that, when executed by the processor, are configured to cause the processor to perform a method, the method comprising: recording eye data, for an eye viewing a screen on a personal computing device, with one or more sensors, determining a visual impairment of the eye based on the recording, calculating a corrective value to address the visual impairment, and adjusting a display system connected to the screen based on the corrective values.

A computer program product, the computer program product comprising a computer readable storage medium having program instructions embodied therewith, the program instructions executable by a computer to cause the computer to: recording eye data, for an eye viewing a screen on a personal computing device, with one or more sensors, determining a visual impairment of the eye based on the recording, calculating a corrective value to address the visual impairment, and adjusting a display system connected to the screen based on the corrective values.

DETAILED DESCRIPTION

In some cases, when a user needs vision correction, standard glasses serve the purpose and are adequately able to compensate for a visual impairment. However, in some instances, glasses may not provide the correction needed. For example, glasses may not account for issues such as eye fatigue, light sensitivity, or prefrail vision loss. Standard glasses also cannot be instantaneously modified as vision changes.

The average American worker spends seven hours a day on the computer either in the office or working from home. Displays do not currently detect visual a user's visual impairments while displaying content.

Computer vision syndrome (e.g., digital eye strain) is a group of eye and vision-related problems that result from prolonged computer, tablet, and/or mobile device use. Many individuals experience eye discomfort and vision problems when viewing digital screens for extended periods. The level of discomfort appears to increase with the amount of digital screen use.

To address these and other problems, some embodiments of the present disclosure may include a display augmentation device that may monitor an eye and adjust a display system to correct for a detected visual impairment. In some embodiments, adjustment is achieved by integrating with an add-on device feedback system. In those embodiments, one or more additional devices may detect one or more visual impairments of a user (such as refraction error, eye strain, or a light sensitivity) and provide feedback to the display adjustment system to tune/adjust the display system to correct for the visual impairment.

Figure 1:
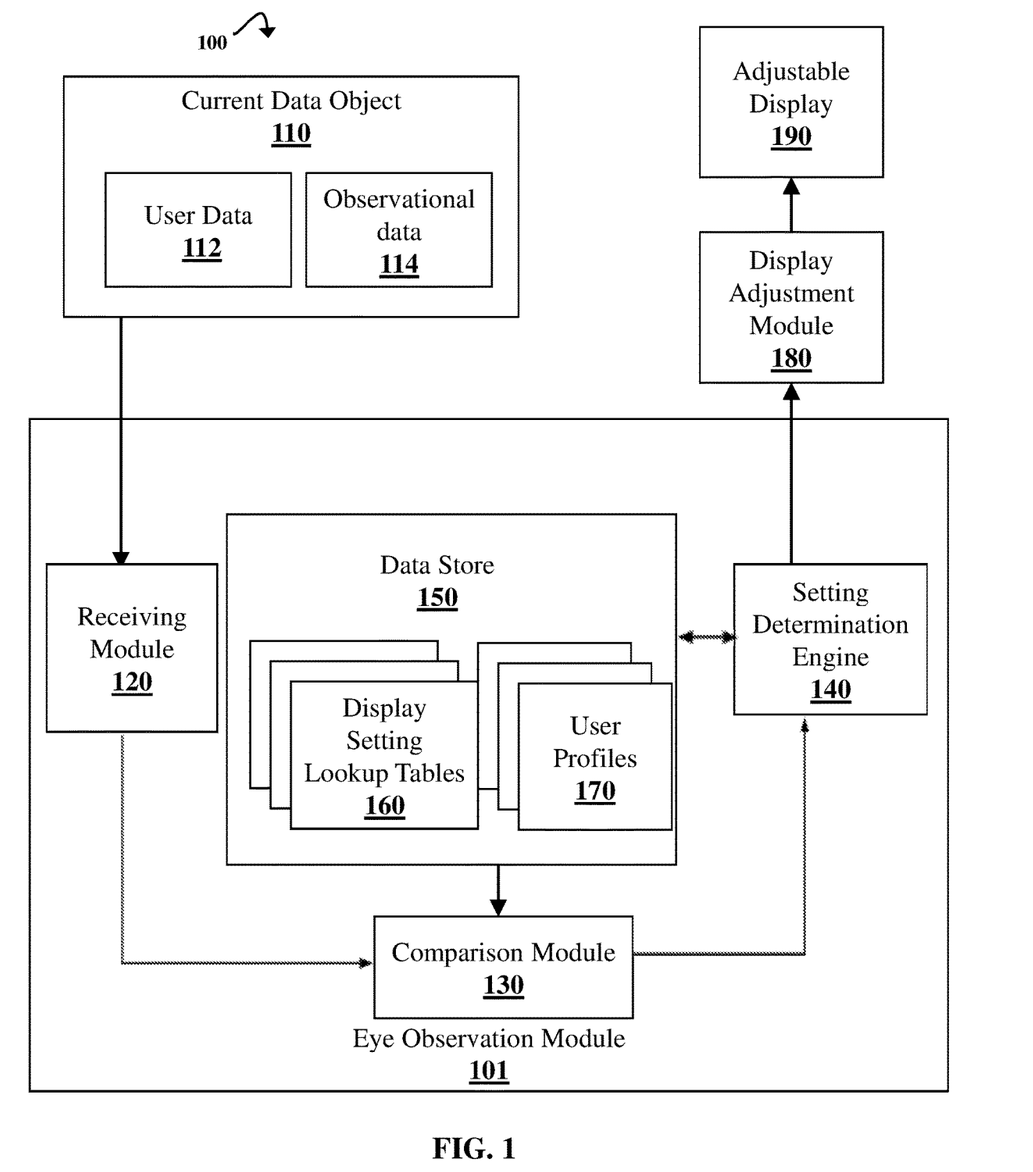
FIG. 1 is a block diagram illustrating components of a display adaptation system according to various embodiments.

FIG. 1 is a block diagram illustrating components of a display adaptation system 100 according to one illustrative embodiment. The display adaptation system 100 includes a current data object 110 with user data 112 and observational data 114, an eye observation module 101, a display adjustment module 180, and an adjustable display 190. In some embodiments, eye observation module 101 may include a receiving module 120, a comparison module 130, a setting determination engine 140, and a data store 150. In some embodiments, data store 150 may include one or more display setting lookup tables 160 and one or more user profiles 170.

In some embodiments, the receiving module 120 may receive current data object 110. In some embodiments a user may input their visual impairment data into the receiving module 120, and in some embodiments, the receiving module 120 may retrieve user data 112 from a data server that stores user sight data. In some embodiments, observational data 114 is retrieved from a data server or from sensors (e.g., retinoscope, scopes, cameras, lenses, glasses, and facial recognition technology). Current data object 110 may include previously entered data that corresponds to the user's sight. Accordingly, the display adaptation system 100 may use the current data object 110 to select which sight data elements are predictive of the adjustment needed for the user. Observational data 114 may be collected through different pieces of technology such as cameras on a user device (e.g., cellular phone camera, laptop camera, etc.). Data elements that are not relevant to such adjustments may be discarded and/or not collected in the future.

In some embodiments, comparison module 130 compares user data 112 (e.g. eye behavior, refractive index from retinoscopy test, and movement) to any other collected data in current data object 110 to determine the user's visual impairment. In some embodiments, comparison module 130 creates display setting lookup tables 160, from user data 112 and stores the models in data store 150. In some embodiments, the display setting lookup tables 160 and user profiles 170 include data collected by sensors enabled with retinoscopy testing on a user device or equipment external to the display system (such as glasses equipped with a retinoscope). In some embodiments, display adaptation system 100 includes user device cameras. In some embodiments, display adaptation system 100 receives data from user device cameras. In some embodiments, display adaptation system 100 does not include user device cameras. In some embodiments, adjustable display 190 utilizes a retinoscopy test which measures the refractive error of the user's eye, through the use of a retinoscope. In some embodiments, a retinoscope is used to shine light into the user's eye and observe any reflex off the user's retina. In some embodiments, the retinoscopy test can be performed using an infrared sensor to detect the refractive error of the user's eye. In some embodiments, the display adaptation system 100 uses display setting lookup tables 160 to predict the proper settings based on the eye measurements of the user and adjustment needed for the user (e.g. refractive index-zoom or changing prescription in the system). In some embodiments, setting determination engine 140 performs the prediction of adjustments needed for the screen. In some embodiments, the comparison module 130 compared user data 112 and observational data 114 to determine if one or more eye readings have changed. In some embodiments, comparison module 130 creates user profile models, such as user profiles 170, from the comparison and stores the user profile models 170 in data store 150. In some embodiments, the display adaptation system 100 uses user profiles 170 to predict the adjustment needed for the user. In some embodiments, setting determination engine 140 performs the prediction of adjustment for adjustable display 190. In some embodiments, the display adjustment module 180 implements the settings determined by setting determination engine 140.

In some embodiments, adjustable display 190 may include glasses, monitors, and screens or lenses positioned between the monitor and a user, fluid filled lenses, bifocal, trifocal, or lenses with zooming capacity to change the visibility of a screen. In some embodiments, adjustable, display 190 may include adjustable corrective glasses configured to modify a visual factor. In some embodiments, the glasses may have one or more lenses that are able to focus a refractive index for each eye. For example, the system may have two flexible lenses with a high refractive index fluid between them. As fluid is introduced, the lenses bow out changing a refractive index of the assembly. In some embodiments, the system may include a lens between the user and monitor. For example, a magnification lens may be placed in front of the monitor and moved or reshaped according to the vision impairment. In some embodiments, the system may include a monitor that may dim or zoom based on the vision impairment. For example, someone with a light sensitivity may have pupils that dilate an inordinate amount when exposed to bright light. The system may record the dilation and reduce the brightness of the monitor to compensate. In some embodiments, the monitor can be configured to account for a visual impairment by changing a font, reducing a resolution, zooming an image, magnifying an area, adjusting a color, adjusting a color scheme, and/or changing the brightness.

In some embodiments, adjustable display 190 may receive adjustment commands from display adjustment module 180 to account for a user's visual impairment. In some embodiments, the adjustment display 190 may keep with the current users setting until a new user is detected. In some embodiments, adjustment display 190 may revert back to a standard setting after a user is no longer active on the device. In some embodiments, the display settings can be saved to the user's device under a profile. In some embodiments, users can then log in on future occasions and adjustable display 190 automatically adjusts the screen for them.

In some embodiments, display adjustment module 180 generates a report to describe the prediction of adjustment needed for the screen so that the user can read it. In some embodiments, these values are then used in the special glasses display system and lenses are used to correct the user's vision to read the screen. In some embodiments, the display adjustment 180 also displays a predicted screen adjustment on the screen of a user's device.

As new data points (such as eye dilation, eyelid movement, or refractive index) are discovered or analyzed from current data object 110, those data points and their corresponding features may be added to data store 150, thus more models may be added to display setting look up tables models 160 and user profiles 170.

Figure 2:
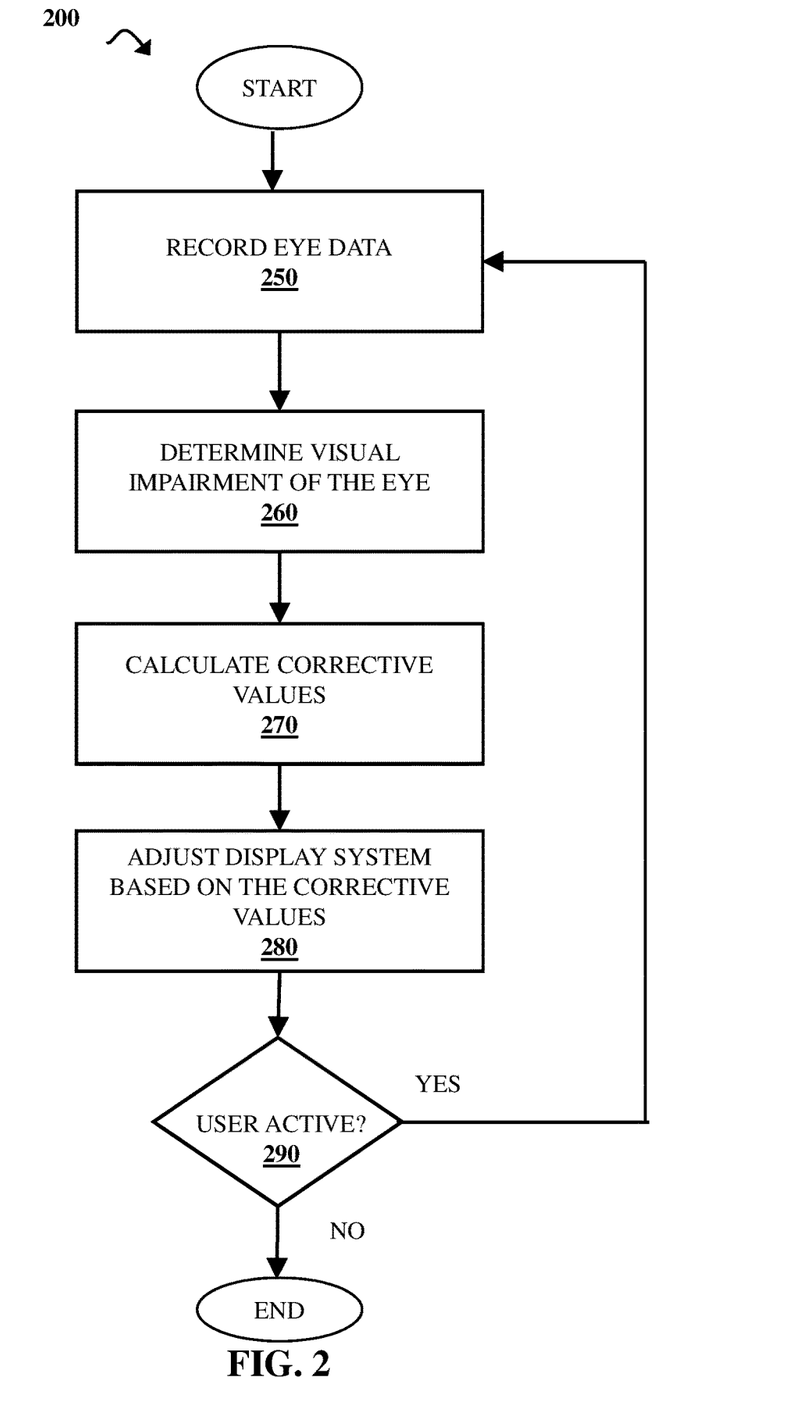
FIG. 2 is an exemplary method for adapting a display system for vision impairment according to various embodiments.

FIG. 2 illustrates a method diagram 200 of display adaptation for visual impairment.

In block 250, the eye data is recorded. In some embodiments, the eye data, for an eye viewing a screen on a personal computing device, is recorded with one or more sensors. In some embodiments, one or more recording devices identify the position, movement, and/or dilation of the eye. For example, a camera may be used to record the movement of an eye lid or eye. The camera may also be used to monitor other physical characteristics of an eye condition, such as bloodshot eyes. In some embodiments, light or some other type of electromagnetic wave can be directed towards the eye and any energy refracted, reflected, and/or emitted from the eye can be recorded.

In block 260, the visual impairment of the eye may be determined. In some embodiments, a visual impairment of an eye is determined based on the recording from block 250. In some embodiments, a retinoscope may be used to determine the refraction of the eye. In some embodiments, the position of the eyelids may be used to determine the presence or severity of a visual impairment. For example, the degree of squinting can indicate the refractive index impairment of the eye. Squinting reduces the effect of a refractive index impairment of an eye. In some embodiments, the position of the eye is used in conjunction with a retinoscope to determine the severity of a refractive index impairment of an eye. In some embodiments, a visual scan of the eye by a camera or infrared monitor can be used to determine an astigmatism.

In some embodiments, a sensor (such as a camera) identifies the position of the user's eye and then tracks the movement of the eye to collect data on the user's sight. In some embodiments, the sensor (such as a retinoscope) determines visual impairments of the eye and other behavior based on the collected data (e.g. hyperopia, astigmatism, nearsightedness, and eye movement). In some embodiments, the system is configured to observe an eye behavior or reading and compare the eye behavior with predefined associations. For example, extended blinks may be associated with eye strain, and if the system observes extended eye blinks it may determine that the user is experiencing eye strain. In some embodiments, one or more associations or patterns may link a behavior or measurement to one or more vision issues. In some embodiments, the behaviors or reading recorded may be linked to a certain solution. For example, both squinting and dilation of pupils may be linked with light sensitivity, but squinting may be associated with a display that is too bright and dilation (or lack thereof) may be associated with ambient light that is too bright.

In block 270, the corrective values needed to address the visual impairments may be calculated. In some embodiments, address includes correcting for visual impairment. For example, changing the refractive index of a set of lenses to correct for an eye refraction impairment. In some embodiments, address includes accounting for visual impairments to allow a user to use a personal computing device. For example, a monitor could zoom in on text so the user can read the text. In some embodiments, the system may calculate the proper settings to correct for the visual impairment or account for the visual impairment. For example, if an astigmatism is detected, the system may determine a cylinder measurement to indicate a lens power and an axis measurement to denote the position of the astigmatism on the cornea. For example, a positive prescription may be calculated if hyperopia (farsightedness) is detected.

In some embodiments, separate corrective values may be calculated for each eye. For example, in a display system employing corrective glasses or lenses, the system may be able to independently accommodate each eye. In some embodiments, the corrective values for both eyes may be averaged to arrive at a single corrective value for the system. For example, some systems may zoom in on text such that the eye with the highest refractive index can distinguish the text.

In block 280, the display may be adjusted based on the corrective values determined in 270. In some embodiments, one or more lenses may be adjusted to account for a refractive error. In some embodiments, a zoom feature may be implemented on one or more screens to a point where the visual impairment is compensated (e.g., a user can read text or distinguish an image). In some embodiments, a distance or effective distance may be changed to mitigate the visual impairment. For example, in a system that includes virtual reality goggles, the screen for each eye may be moved closer or farther away from each individual eye. For example, the system may introduce a magnification effect to an image to make it appear closer. In some embodiments, the calculations are used to adjust a display system based on the correction values for each eye. In some embodiments, a combination of techniques may be used to correct for visual impairments. For example, lenses of glasses in a display system may be used to correct for an astigmatism and a lens in front of the monitor my correct for a refractive index in both eyes.

In block 290, the system may detect if the user is still active. If the user is no longer active, the system may terminate method 200. If the user is still active, the system may continue the monitoring process by returning to block 250. In some embodiments, once the system returns to block 250, the system may compare data recorded in a previous iteration to the current readings. If the readings have changed the system may then continue with the process at block 260. If the readings have not changed, the system may proceed to block 290.

Figure 3:
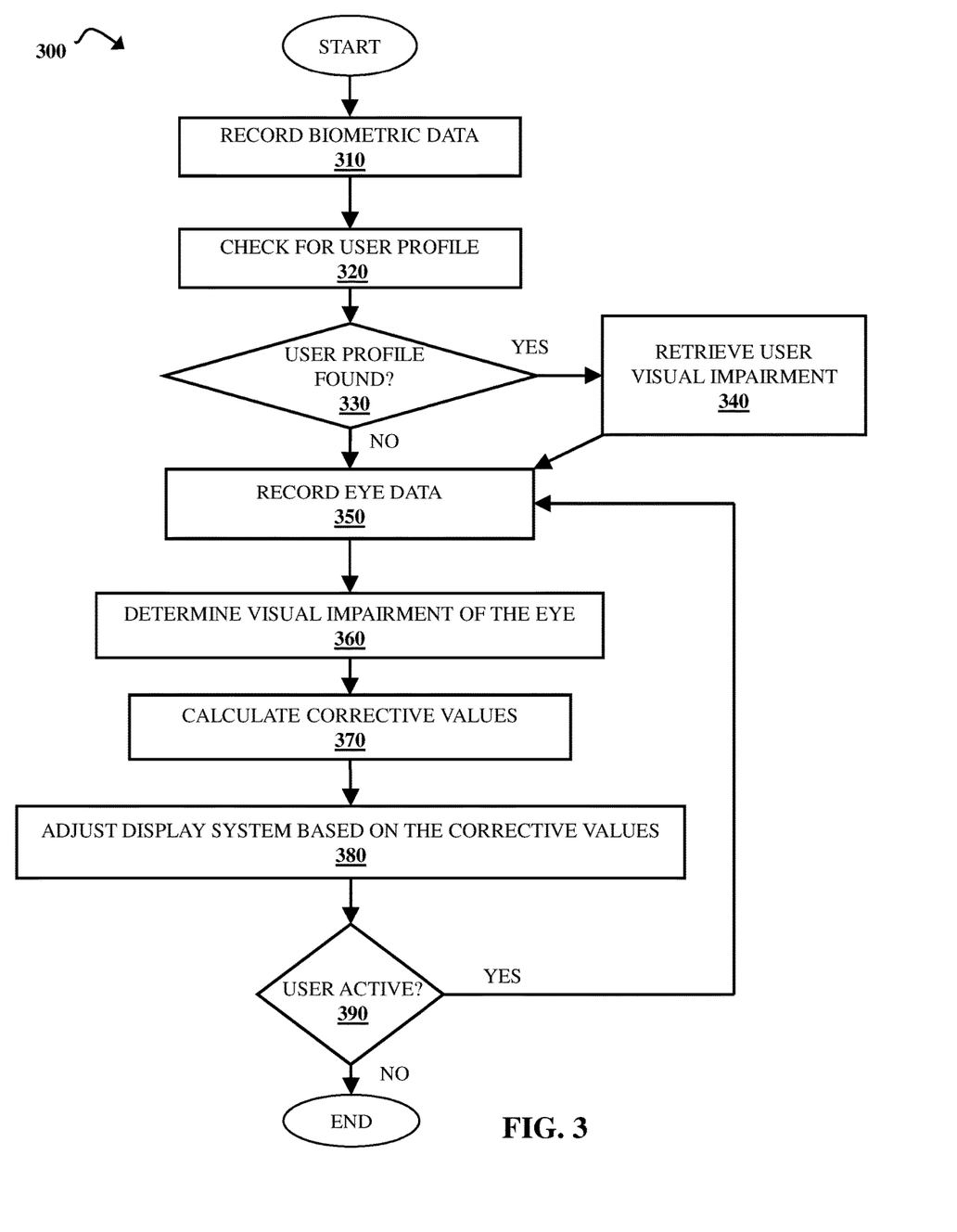
FIG. 3 is an exemplary method for adapting a display system for vision impairment with a user profile according to various embodiments.

FIG. 3 illustrates a method diagram 300 of display adaptation for visual impairment with a user profile.

In block 310, the system may record biometric data using facial recognition to identify the user. In some embodiments, this records eye recognition to assess the user's visual data, their eye behavior, visual impairments, and refractive error if any.

In block 320, the system may check for a user profile. In some embodiments, the checking can be performed by using facial recognition technology in the user's device camera if it is equipped with retinoscopy capabilities (e.g., the user's phone camera has a retinoscopy test capability).

In block 330, the system may check whether a profile was found for the user. In some embodiments, if a profile was found, the system proceeds to block 340, if a profile is not found, the system proceeds to block 350.

In block 340, if a profile is found, the system may retrieve the user's visual impairment information (e.g., hyperopia, astigmatism, nearsightedness, and eye movement). In some embodiments, the visual impairment information may be the form of a prescription from an optometrist. In some embodiments, the visual impairment information is from a previous session by a display adaptation system. In some embodiments, the display adaptation system may create a user profile by adjusting the display and prompting a user response to calibrate the settings. In some embodiments, after retrieving the user's visual impairment information, the system proceeds to block 370.

In block 350 the eye data is recorded. In some embodiments, one or more recording devices identify the position, movement, and/or dilation of the eye. In some embodiments, the recorded eye data may be compared to eye data in a user profile. For example, a change in squinting might indicate that the user's glasses prescription has changed. In some embodiments, the system can notify the user of a result of the comparison. In some embodiments, the comparison may be used as a quality check to see if the system is recording accurate data. In some embodiments, the recorded eye data may be saved in a user profile. In some embodiments, the recording includes monitoring the position and movement of the eye, monitoring the position and movement of the eye lid, directing one or more lights into the eye, and monitoring the light radiation returned from the eye.

In block 360, the visual impairment of the eye may be determined. In some embodiments, the determined visual impairment may be compared to eye data in a user profile. For example, a change dilation of the pupil when exposed to the same intensity of light may indicate a light sensitivity. In some embodiments, the system can notify the user of a result of the comparison. In some embodiments, the visual impairments of the eye may be saved in a user profile.

In block 370, the visual impairment of the eye is determined. For example, the visual impairment detected may include a refractive error, an astigmatism, visual obscuring (such as cataracts), loss of peripheral vision, and/or light sensitivity. In some embodiments, the system may determine a corrective value for the visual impairment. For example, the corrective value may be calculated in diopters based off the data on the user's visual impairments. In some embodiments, the corrective values include values for both eyes (e.g. a value in diopters for the right and a value in diopters for the left eye.)

In block 380, the display system is adjusted based on the calculated corrective values. In some embodiments, one or more pieces of equipment in the display system may be adjusted based on block 370. For example, a screen may be dimmed to accommodate for a light sensitivity and a set of lenses may be focused to account for a refractive error in the eye. In block 390, the system may detect if the user is still active. If the user is no longer active, the system may terminate method 300. If the user is still active, the system may continue the monitoring process by returning to block 350. In some embodiments, once the system returns to block 350, the system may compare data recorded in a previous iteration to the current readings. If the readings have changed, the system may then continue with the process at block 360. If the readings have not changed, the system may proceed to block 390.

Figure 4:
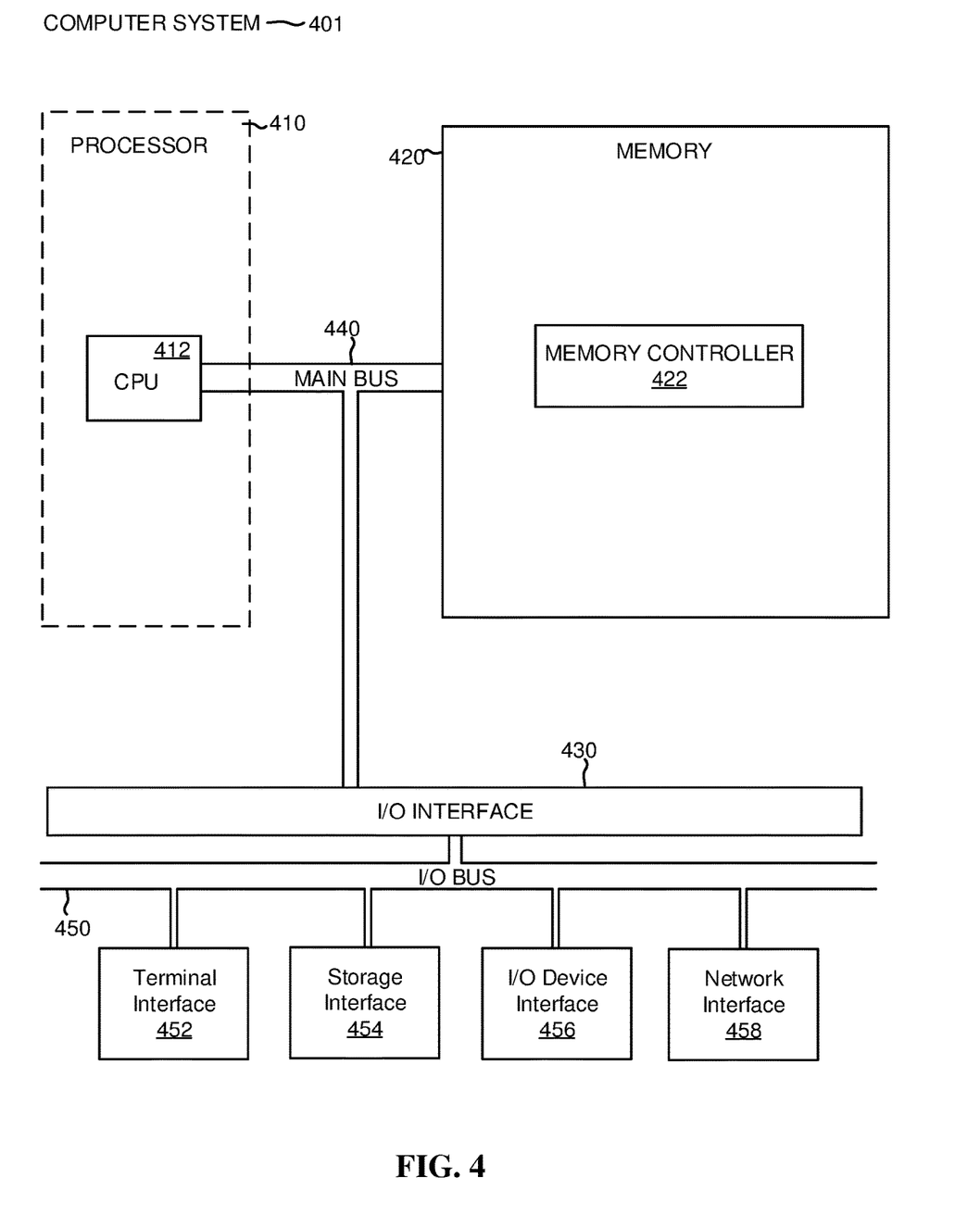
FIG. 4 depicts a computer system according to various embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or more methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
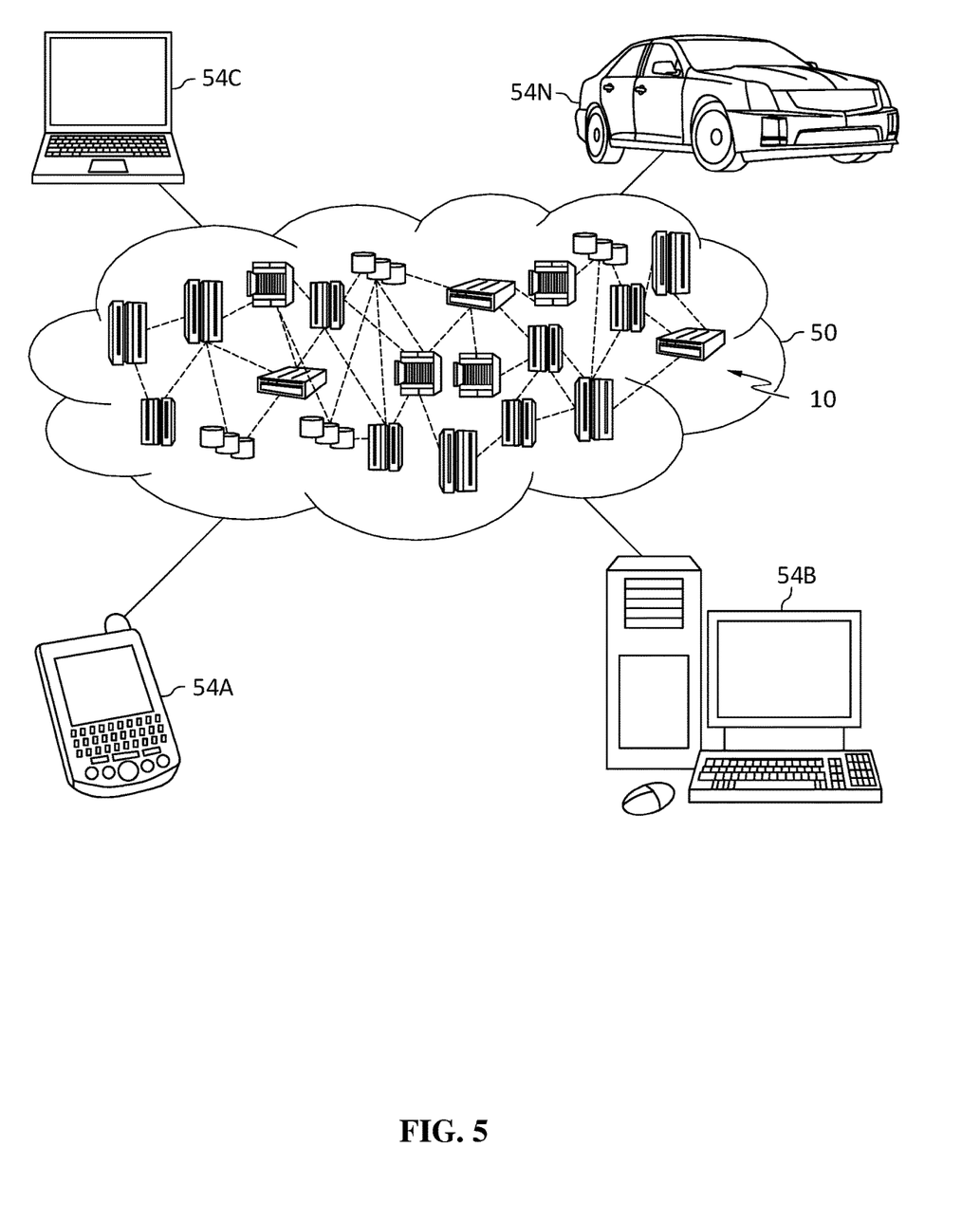
FIG. 5 depicts a cloud computing environment according to various embodiments.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
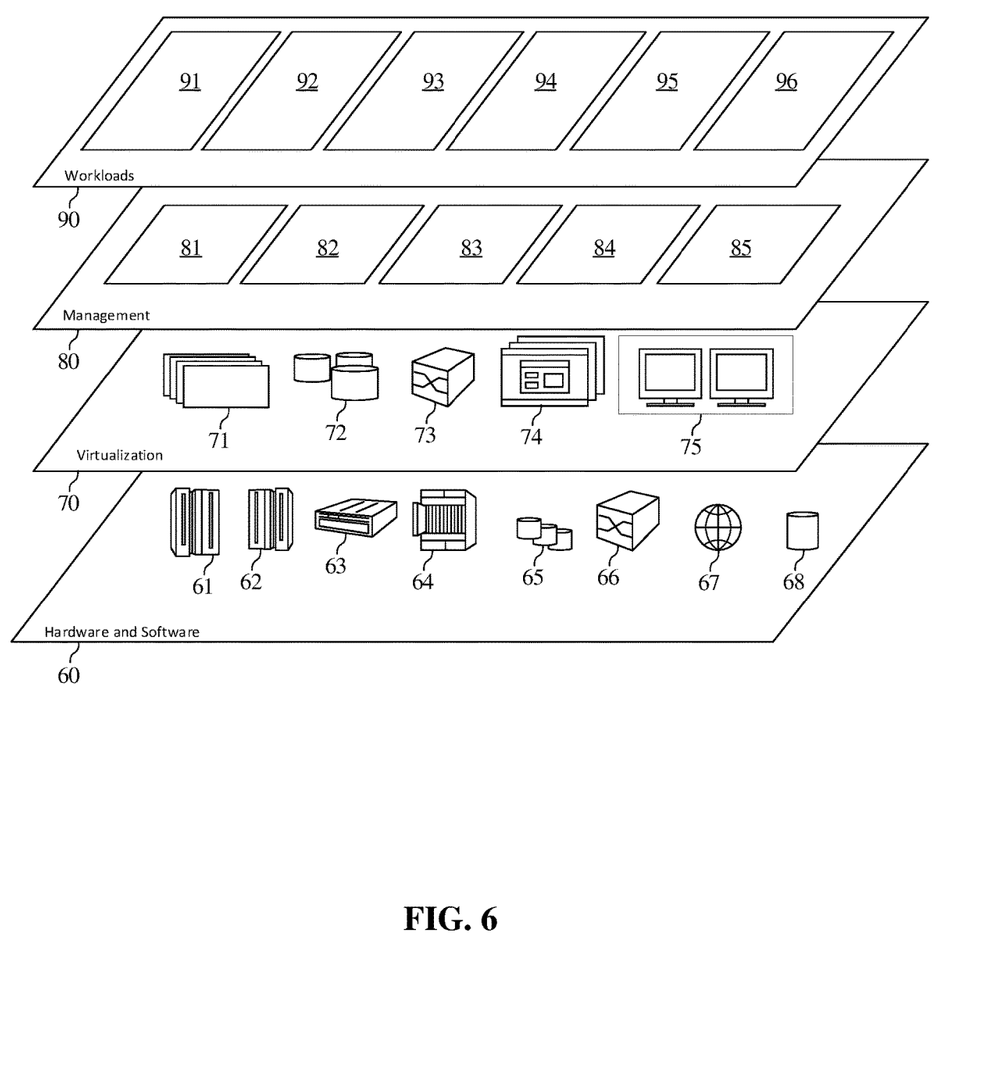
FIG. 6 depicts abstraction model layers according to various embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a "set" of an object does not equate to all available instances of that object. For example, if four files were available, a set of files may not contain all four files. Further, as used herein, the phrase "each of a set" of an object refers only to the instances of that object of that set. For example, if four files were available, the phrase "a set of two files from the four files, each of the files in the set being read only" would properly be interpreted as implying that two files (the two files in the set) are read only. The two files of the four available files that are not in the set may or may not be read only.

The descriptions of the various embodiments of the present disclosure have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:
1. A method comprising:
   recording eye data, for an eye viewing a screen on a personal computing device, with one or more sensors, wherein the eye data comprises a degree of squinting;
   comparing the recorded eye data with historical eye data in a user profile, wherein the user profile contains historical corrective values;
   determining, based on the comparing, a change in visual impairment of the eye based on the recording;

calculating, based on the change in visual impairment and the historical corrective values, a corrective value to address the change in visual impairment;
monitoring eye behavior;
extrapolating the eye behavior into a first eye behavior pattern;
receiving predefined eye behavior patterns linked to one or more vision issues;
comparing the first eye behavior pattern to the predefined eye behavior patterns;
correlating, based on comparing the first eye behavior pattern to the predefined eye behavior patterns, the first eye behavior pattern to a first vision issue and a first solution to the first vision issue; and
adjusting a display system connected to the screen based on the corrective values and the first solution.

2. The method of claim 1,
wherein the determining further comprises receiving a prescription from a user.

3. The method of claim 1,
wherein the recording further comprises monitoring the eye with a retinoscopy device to determine a refractive error of the eye.

4. The method of claim 3, wherein the refractive error is hyperopia.

5. The method of claim 1, wherein the visual impairment comprises an astigmatism.

6. The method of claim 1,
wherein the display system includes glasses; and
wherein the glasses are configured to modify a visual factor.

7. The method of claim 1,
wherein the adjusting comprises adjusting at least one variable selected from the group consisting of changing a font, reducing a resolution, zooming an image, magnifying an area, adjusting a color, adjusting a color scheme, and changing a brightness.

8. The method of claim 1, wherein the recording includes:
monitoring a position and a movement of the eye;
monitoring a position and a movement of an eye lid;
directing one or more lights into the eye; and
monitoring a light radiation returned from the eye.

9. A system comprising:
a processor; and
a memory in communication with the processor, the memory containing program instructions that, when executed by the processor, are configured to cause the processor to perform a method, the method comprising:
recording eye data, for an eye viewing a screen on a personal computing device, with one or more sensors, wherein the eye data comprises a degree of squinting;
comparing the recorded eye data with historical eye data in a user profile, wherein the user profile contains historical corrective values;
determining, based on the comparing, a change in visual impairment of the eye based on the recording;
calculating, based on the change in visual impairment and the historical corrective values, a corrective value to address the change in visual impairment;
monitoring eye behavior;
extrapolating the eye behavior into a first eye behavior pattern;
receiving predefined eye behavior patterns linked to one or more vision issues;
comparing the first eye behavior pattern to the predefined eye behavior patterns;
correlating, based on comparing the first eye behavior pattern to the predefined eye behavior patterns, the first eye behavior pattern to a first vision issue and a first solution to the first vision issue; and
adjusting a display system connected to the screen based on the corrective values and the first solution.

10. The system of claim 9,
wherein the determining further comprises receiving a prescription from a user.

11. The system of claim 9,
wherein the recording further comprises monitoring the eye with a retinoscopy device to determine a refractive error of the eye.

12. The system of claim 11, wherein the refractive error is hyperopia.

13. The system of claim 9, wherein the visual impairment comprises an astigmatism.

14. The system of claim 9,
wherein the display system includes glasses; and
wherein the glasses are configured to modify a visual factor.

15. The system of claim 9,
wherein the adjusting comprises adjusting at least one variable selected from the group consisting of changing a font, reducing a resolution, zooming an image, magnifying an area, adjusting a color, adjusting a color scheme, and changing a brightness.

16. The system of claim 9, wherein the recording includes:
monitoring a position and a movement of the eye;
monitoring a position and a movement of an eye lid;
directing one or more lights into the eye; and
monitoring a light radiation returned from the eye.

17. A non-transitory computer readable storage medium having program instructions embodied therewith, the program instructions executable by a computer to cause the computer to:
record eye data, for an eye viewing a screen on a personal computing device, with one or more sensors, wherein the eye data comprises a degree of squinting;
compare the recorded eye data with historical eye data in a user profile, wherein the user profile contains historical corrective values;
determine, based on the comparing, a change in visual impairment of the eye based on the recording;
calculating, based on the change in visual impairment and the historical corrective values, a corrective value to address the change in visual impairment;
monitoring eye behavior;
extrapolating the eye behavior into a first eye behavior pattern;
receiving predefined eye behavior patterns linked to one or more vision issues;
comparing the first eye behavior pattern to the predefined eye behavior patterns;
correlating, based on comparing the first eye behavior pattern to the predefined eye behavior patterns, the first eye behavior pattern to a first vision issue and a first solution to the first vision issue; and
adjusting a display system connected to the screen based on the corrective values and the first solution.

* * * * *